(12) United States Patent
Sen et al.

(10) Patent No.: US 11,802,244 B1
(45) Date of Patent: Oct. 31, 2023

(54) GEMINI SURFACTANT FOR USE IN RECYCLING LITHIUM BATTERIES

(71) Applicant: KING FAISAL UNIVERSITY, Al-Ahsa (SA)

(72) Inventors: Tushar Kanti Sen, Al-Ahsa (SA); Chi Phan, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/186,584

(22) Filed: Mar. 20, 2023

(51) Int. Cl.
  *C09K 23/20* (2022.01)
  *H01M 10/54* (2006.01)
  *C22B 7/00* (2006.01)

(52) U.S. Cl.
  CPC .............. *C09K 23/20* (2022.01); *C22B 7/006* (2013.01); *H01M 10/54* (2013.01)

(58) Field of Classification Search
  CPC ......... C09K 23/20; C22B 7/006; H01M 10/54
  See application file for complete search history.

(56) References Cited

U.S. PATENT DOCUMENTS

| | | |
|---|---|---|
| 2012/0312126 A1 | 12/2012 | Yamagushi et al. |
| 2014/0306162 A1 | 10/2014 | Poe et al. |
| 2016/0045841 A1 | 2/2016 | Kaplan et al. |
| 2019/0260100 A1 | 8/2019 | Sloop |
| 2020/0172831 A1 | 6/2020 | Dhawan et al. |

FOREIGN PATENT DOCUMENTS

JP 2016519936 A 7/2016

OTHER PUBLICATIONS

Skukla, Dipti, et al., Anionic Gemini Surfactants: A Distinct Class of Surfactants, Journal of Oleo Science, vol. 55, No. 5, 215-226 (2006). (Year: 2006).*
Shukla et al., "Anionic Gemini Surfactants: Synthesis and Surface Active Properties", Surface Review and Letters (2007), vol. 14, No. 5, pp. 991-997 (Abstract only).
Yukun Li et al., "Recycling of spent lithium-ion batteries in view of green chemistry", Green Chemistry (2021), Issue 17 (Abstract only).
Yuanfengpu et al., "Innovative recycling of organic binders from electric vehicle lithium-ion batteries by supercritical carbon dioxide extraction", Resources, Conservation and Recycling (2021), vol. 172, 105666.

* cited by examiner

*Primary Examiner* — Melissa S Swain
(74) *Attorney, Agent, or Firm* — Nath, Goldberg & Meyer; Richard C. Litman

(57) ABSTRACT

The gemini surfactant for use in recycling lithium batteries is an anionic surfactant having the generic formula $C_xH_{2x+1}(C_yH_{2y+1}) PO_4C_zH_{2z}PO_4C_xH_{2x+1}(C_yH_{2y+1})$. An example of the surfactant is shown as compound 1 below where (x=5, y=2, z=4). Current solvents used to remove polymer binders include Nmethyl-2-pyrrolidone (NMP), N—N-dimethylformamide (DMF), N—N-dimethylacetamide (DMAC), N—N-dimethylsulfoxide (DMSA), and ethanol. The benchmark solvent often used to dissolve polymer binders is NMP. However, the present surfactants are phosphate-based surfactants and are used with a phosphate-based solvent, namely, triethyl phosphate (TEP), which is cheaper and more environmentally friendly than NMP. However, TEP has weaker binder solubility than NMP. Thus, the present surfactants are used with sonication to remove polymer binders.

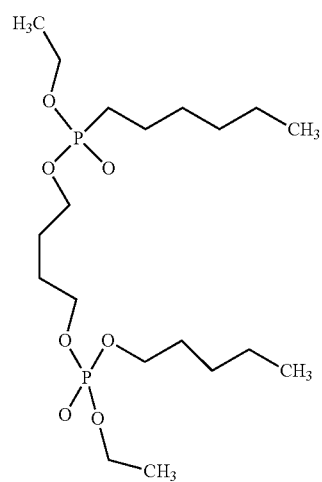

1

7 Claims, No Drawings

GEMINI SURFACTANT FOR USE IN RECYCLING LITHIUM BATTERIES

BACKGROUND

1. Field

The disclosure of the present patent application relates to surfactants, and particularly to a gemini surfactant for use in recycling lithium batteries.

2. Description of the Related Art

In recent years, rechargeable lithium-ion batteries have become very popular as a portable source of electrical power for many different types of appliances. There is also some speculation that lithium batteries may provide an alternative to fossil fuels for powering electric automobiles. In view of the still-growing popularity of lithium batteries and the scarcity and expense of the materials used to make the batteries, it would be desirable to provide an efficient, commercially attractive process for recycling lithium batteries under relatively mild conditions.

Lithium batteries are made from various materials, including lithium, cobalt, aluminum, copper, manganese, nickel, and graphite. Since the metal layers tend to become delaminated, an organic polymer, most frequently polyvinylidene fluoride (PVDF) is used to bind the materials together, as well as to facilitate the exchanges of electric charges between the electrodes. Commercially, mechanical processes are used to separate the copper and aluminum foils used at the electrodes from the remaining fine particles (often referred to in the art as a "black mass"), which undergo pyrolysis or hydrometallurgical processes to remove the binder, which adheres to the fine particles. However, such processes often release hydrogen fluoride (HF) or fluorocarbons, requiring expensive scrubbers to remove harmful admissions, or use harsh solvents under extreme conditions.

Recently, research has focused on alternative surfactants to remove the PVDF binder under milder conditions. One such class of surfactants is gemini surfactants, which include two long hydrophobic tails, each tail headed by a small hydrophilic head, the heads being joined by a short bridge. However, to date, no such surfactant has been found suitable for commercial use in recycling lithium batteries.

Thus, a gemini surfactant for use in recycling lithium batteries solving the aforementioned problems is desired.

SUMMARY

The gemini surfactant for use in recycling lithium batteries is an anionic surfactant having the generic formula $C_xH_{2x+1}(C_yH_{2y+1})$ $PO_4C_zH_{2z}PO_4C_xH_{2x+1}(C_yH_{2y+1})$. An example of the surfactant is shown as compound 1 below where (x=5, y=2, z=4). Current solvents used to remove polymer binders include Nmethyl-2-pyrrolidone (NMP), N—N-dimethylformamide (DMF), N—N-dimethylacetamide (DMAC), N—N-dimethylsulfoxide (DMSA), and ethanol. The benchmark solvent often used to dissolve polymer binders is NMP. However, the present surfactants are phosphate-based surfactants and are used with a phosphate-based solvent, namely, triethyl phosphate (TEP), which is cheaper and more environmentally friendly than NMP. However, TEP has weaker binder solubility than NMP. Thus, the present surfactants are used with sonication to remove polymer binders.

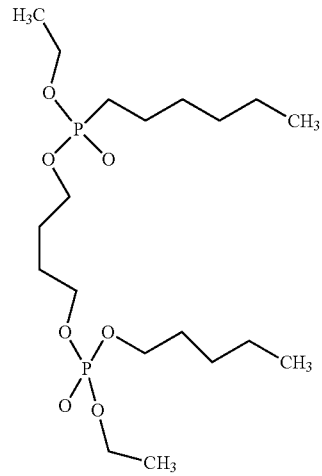

The surfactant(s) are made by reacting alkyl biphosphonate with the corresponding alcohol. The reaction occurs in tetrahydrofuran (THF) at room temperature.

In use, the surfactants are dissolved in triethyl phosphate (TEP) at a concentration of 1% wt. "Black mass" material (from disassembled lithium batteries) is mixed with the solution at 10% wt. The sample is sonicated at a high frequency (between 20 to 80 kHz) to remove the PVDF binder. The metal oxide powder is leached and separated by solvent extraction.

These and other features of the present subject matter will become readily apparent upon further review of the following specification.

DETAILED DESCRIPTION OF THE PREFERRED EMBODIMENTS

The gemini surfactant for use in recycling lithium batteries is an anionic surfactant having the generic formula $C_xH_{2x+1}(C_yH_{2y+1})$ $PO_4C_zH_{2z}PO_4C_xH_{2x+1}(C_yH_{2y+1})$. An example of the surfactant is shown as compound 1 below where (x=5, y=2, z=4). Current solvents used to remove polymer binders include Nmethyl-2-pyrrolidone (NMP), N—N-dimethylformamide (DMF), N—N-dimethylacetamide (DMAC), N—N-dimethylsulfoxide (DMSA), and ethanol. The benchmark solvent often used to dissolve polymer binders is NMP. However, the present surfactants are phosphate-based surfactants and are used with a phosphate-based solvent, namely, triethyl phosphate (TEP), which is cheaper and more environmentally friendly than NMP. However, TEP has weaker binder solubility than NMP. Thus, the present surfactants are used with sonication to remove polymer binders.

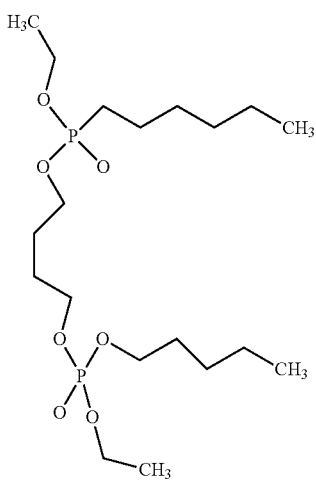

The surfactant(s) are made by reacting alkyl biphosphonate with the corresponding alcohol. The reaction occurs in tetrahydrofuran (THF) at room temperature.

In use, the surfactants are dissolved in triethyl phosphate (TEP) at a concentration of 1% wt. "Black mass" material (from disassembled lithium batteries) is mixed with the solution at 10% wt. The sample is sonicated at a high frequency (between 20 to 80 kHz) to remove the PVDF binder. The metal oxide powder is leached and separated by solvent extraction.

The binders used in lithium-ion batteries are organic compounds that connect different parts of the batteries. These organics are very strong, adhesive and hydrophilic. The stable properties are essential to maintain the batteries' functions during charging and discharging cycles. The strength of binders becomes a problem in the recycling of Lithium-ion batteries. The current removal technology is based on either a thermal process (burning in a furnace at high temperature) or solvent extraction with expensive and hazardous solvents (such as NMP). The present surfactants avoid air pollution and hazardous solvents and reduce energy consumption. The process produced "black mass" without complex metal oxides (from the burning process) and enhanced the recovery of valuable metals.

The journal article by Shukla et al. entitled "Anionic gemini surfactants: synthesis and surface active properties", Surface Review and Letters, Vol. 14, No. 05, pp. 991-997 (2007) describes a similar process for synthesizing the surfactant(s). As described in Shukla, the compounds have two phosphate groups and two long chains (dodecyl) and were prepared by two-step reaction: (i) phosphorylation of dodecanol with pyrophosphoric acid, (ii) reaction of dodecyl phosphate with N(CH3)4OH and 1,6-dibromo hexane. The effect of reaction variables like time and molar ratio of reactants on yield has also been reported. The 1:2:0.5 molar ratio of reactants (dodecyl phosphate, N(CH3)4OH, and Br(CH$_2$)$_6$Br, respectively) and 3 h duration resulted to give maximum yield of anionic gemini surfactants. The structure of synthesized surfactant was investigated by modern analytical techniques, viz. FT-IR, $^1$H NMR, $^{13}$C NMR. Amphipathic disodium phosphates were obtained by neutralization of free acids with sodium hydroxide and their surface-active properties in aqueous solution were measured. These disodium phosphates possessed 77.3% anionic content and showed good water solubility.

However, as noted above, the present gemini surfactant(s) are made by reacting alkyl biphosphonate with the corresponding alcohol. The reaction occurs in tetrahydrofuran (THF) at room temperature. The synthesized surfactants have been characterized by $^1$H NMR and $^{13}$C NMR.

It is to be understood that the gemini surfactant for use in recycling lithium batteries is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A gemini surfactant for use in recycling lithium batteries, comprising a compound having the formula $C_xH_{2x+1}(C_yH_{2y+1})$ $PO_4C_zH_{2z}PO_4C_xH_{2x+1}(C_yH_{2y+1})$, wherein x=5, y=2, and z=4.

2. The gemini surfactant according to claim 1, wherein the gemini surfactant has the formula:

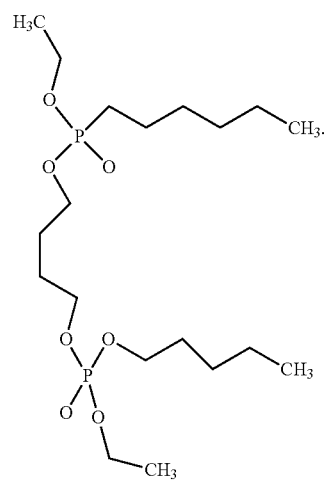

3. The gemini surfactant according to claim 1, wherein the phosphate (PO4) groups are ionic, whereby the gemini surfactant has anionic, hydrophilic heads.

4. The gemini surfactant according to claim 1, wherein the compound is soluble in a phosphate-based solvent.

5. The gemini surfactant according to claim 1, wherein the gemini surfactant is soluble in triethyl phosphate (TEP).

6. A method for recycling lithium-ion batteries, including the steps of:
   disassembling at least one lithium-ion battery to leave fine, particulate material from the battery joined by a binder of polyvinylidene fluoride in a form known as a black mass;
   dissolving an anionic gemini surfactant of formula $C_xH_{2x+1}(C_yH_{2y+1})$ $PO_4C_zH_{2z}PO_4C_xH_{2x+1}(C_yH_{2y+1})$ in triethyl phosphate solvent at a concentration of 1% wt, wherein x=5, y=2, and z=4;
   mixing the black mass from the lithium-ion battery with the solution of the anionic gemini surfactant at 10% wt to form a mixture; and
   sonicating the mixture at a frequency between 20 kHz and 80 kHz to remove the polyvinylidene fluoride binder from the mixture and leave a metal oxide powder.

7. The method for recycling lithium-ion batteries according to claim 6, further including the steps of:

leaching the metal oxide powder; and
separating metal oxides from the leached metal oxide powder by solvent extraction.

\* \* \* \* \*